Aug. 24, 1926.

B. O. GODFREY

PITCHOMETER TOOL

Filed Oct. 26, 1925   2 Sheets-Sheet 1

1,597,357

Inventor

*Bert O. Godfrey*

By Reynolds

Attorneys

Aug. 24, 1926.
B. O. GODFREY
1,597,357
PITCHOMETER TOOL
Filed Oct. 26, 1925　　2 Sheets-Sheet 2
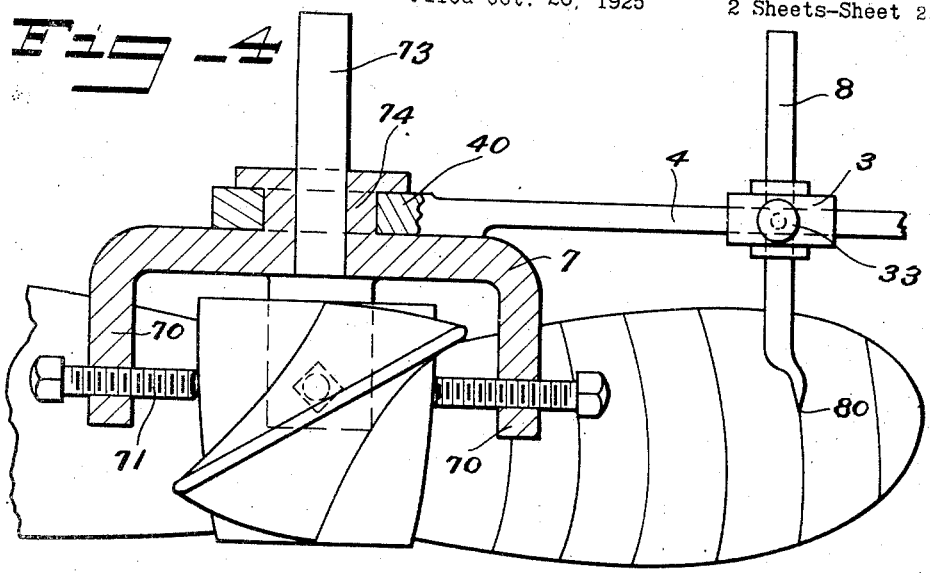
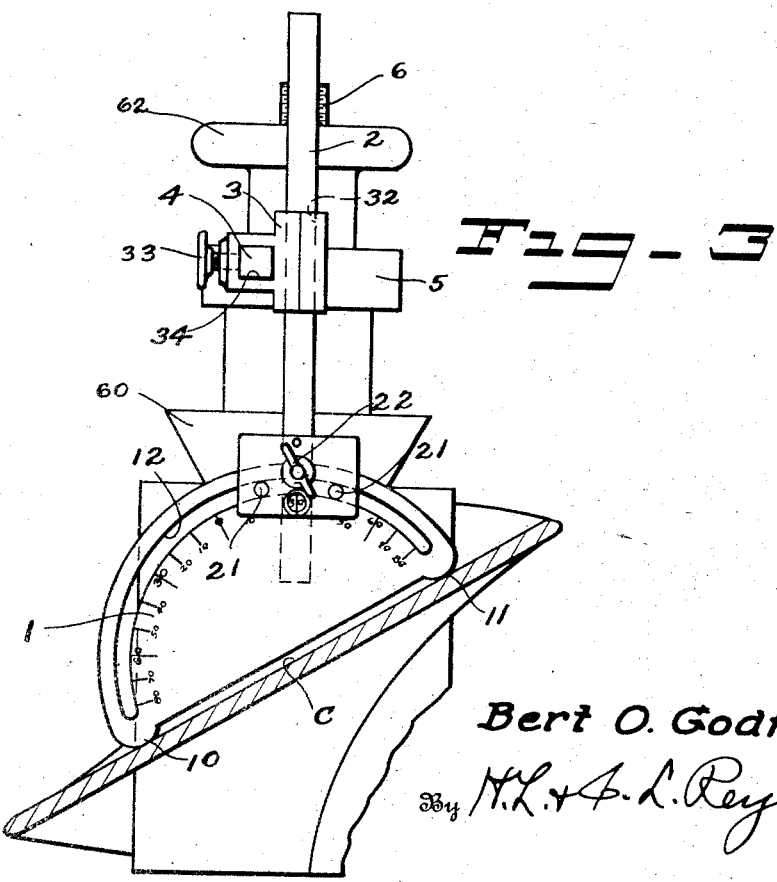
Inventor
Bert O. Godfrey
By N.L. & A.L. Reynolds
Attorneys Patented Aug. 24, 1926.

1,597,357

UNITED STATES PATENT OFFICE.

BERT O. GODFREY, OF SEATTLE, WASHINGTON.

PITCHOMETER TOOL.

Application filed October 26, 1925. Serial No. 64,757.

My invention relates to tools for use in determining and measuring the pitch of propeller wheels. In its present form, my invention is an improvement upon the pitchometer shown in my application, Serial No. 659,544, filed August 27, 1923, and upon the pitchometer shown in my Patent No. 1,547,380.

It is an object of my present invention to provide a tool for the use indicated, which is capable of greater accuracy than the hand tool illustrated in my application referred to, and which is simpler than the device of the patent. More especially it is my object to provide a tool which will maintain the protractor always in a plane which is parallel with the axis of the propeller to be measured, and always in a plane which is tangent to any radius through the propeller axis.

Another object is the provision of such a tool in which the two spaced contact points or trammel points of the protractor are maintained always at the ends of a chord through a radius struck from the propeller axis. In other words, the center of the protractor is always precisely in a radius through the propeller axis, and is never swung, however slightly, to one side or the other of such radius.

A further object is the provision of such a tool in which the protractor can be replaced by a marking-out tool, by means of which circles of proper radius can be marked on the propeller plates, preparatory to testing and truing up of the propeller.

In addition, it is an object to provide a tool of the character described which can be readily applied either to propellers which are removed from their shafts or to those remaining on the shafts.

My invention comprises the novel parts and the novel combination and arrangement thereof as shown in the accompanying drawings, described in the specification, and particularly defined by the claims terminating the same.

In the accompanying drawings I have shown my invention in forms which are now preferred by me.

Figure 3 is a side elevation of the protractor and its support, taken substantially along the line 3—3 of Figure 2;

Figure 4 is a view similar to Figure 2, a part of the supporting element of the pitchometer being shown in section, and the device being shown as applied to an unbored propeller, and for the purpose of inscribing circles on the blades thereof.

Figures 1, 2:
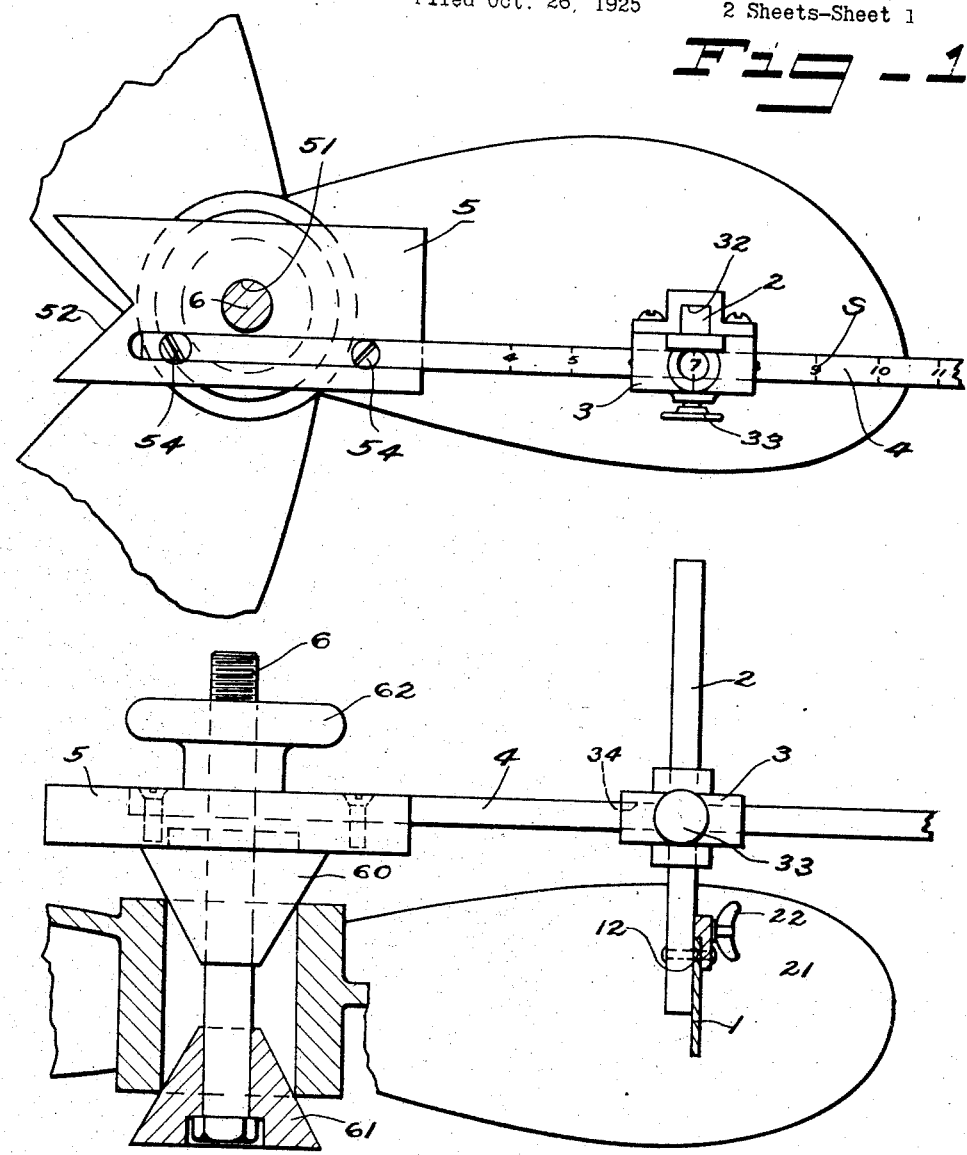
Figure 1 is an elevation of my invention applied to a propeller.
Figure 2 is a side elevation thereof.

It is essential, of course, that a device for measuring the pitch be applied at points equally distant from a radial line through the axis of the propeller and also at equal distances from such axis. In other words, where a protractor is used with two trammel points to contact with the blade, these trammel points must touch the blade at the ends of short chords through a radius, which radius must pass through the center of the base line of the protractor. If the trammel points touch in any other manner, the accuracy of the device is destroyed. In practice, in order to maintain the trammel points in this position it is necessary that the protractor be maintained always in a plane which is parallel to the propeller axis, and which is tangent to a radius of the propeller.

The protractor 1 is illustrated as having two trammel points 10 and 11 which lie in its base line and which are spaced at equal distances from the center C of the base line of the protractor. The protractor is supported from a depending arm 2 in such a manner that it may swing freely about its center C. While this might be an ordinary pivotal connection, because of the fact that the base line of the protractor includes also the trammel points 10 and 11 as well as the center C, it is impractical to pivot the protractor upon the arm 2 at this center. Hence, I prefer that the protractor be provided with a part-circular slot 12 which receives two spaced pins 21 carried upon the lower end of the arm 2, by means of which the protractor may swing about its exact center C without displacing this center. A wing nut 22, or like element, may be employed to clamp the protractor in any given position.

The protractor and its arm 2 must be supported in such a manner that they are maintained rigidly in definite relation to the axis of the propeller, yet the protractor must be movable vertically lengthwise of the arm 2 and must be movable bodily towards or from the axis of the propeller. I have, therefore, shown the arm 2 as receivable in a vertical guide 32 of a slide 3. The slide is radially movable by means of a second guide 34 within which a lateral arm 4 is slidable.

The arm 4 is suitably supported for connection to the propeller. In Figures 1 and 2 it is shown as received in a base 5, being secured therein by counter-sunk screws 54 slightly off-center to bring the center of the vertical arm 2 in a radius through the axis of the propeller. The base 5 is provided with a central hole 51 and likewise with a notch 52 aligned therewith. The hole 51 is adapted to receive a bolt 6 passing through centering cones 60 and 61 and retained by a nut 62, by means of which the base is centered with the axis of the propeller, if the latter is bored. For a propeller which is not removed from its shaft, the notch 52 may be employed to center the base relative to the shaft itself, using the tail nut to clamp the base in proper position. For propellers which have not been bored, a frame 7 may be employed, this having depending arms 70 in which clamping screws 71 are received, these clamping upon the hub of the propeller. The arm 4 in this instance is provided with a base 40 receivable upon a central hub 74 of the base 7, the base being shown also with a projecting spindle 73 for a purpose to be described.

The protractor 1 and its arm 2 may be replaced by a scribing tool 8 having a marking point 80. This is receivable in the guide 32, the arm 2 being removed. With this tool in place, the slide 3 can be placed at proper distances, as indicated by a scale S on the arm 4 and may be held in position by a suitable clamping screw 33. Circles are then struck on the blades, as indicated in Figure 4. Then by applying the protractor at the distances indicated and applying its trammel points 10 and 11 on the circles thus struck, the exact inclination of the blade at this particular point can be ascertained. It is not necessary to strike the circles on the blades of the propeller, inasmuch as the scale S determines the radial position of the protractor, and the form of mounting insures that the trammel points will be exactly and properly positioned relative to the axis of the propeller.

The circles are desirable for the use of a mechanic who is truing up the propeller after the deviation from proper pitch has been determined and after the tool has been removed.

The device shown in Figure 4 can be employed for unbored propellers and to determine the proper center and inclination of the bore. By applying the tool with this base 7 to an unbored propeller and checking its pitch, the base 7 can be exactly positioned with its spindle 73 in alignment with the proper axis of the propeller. With this base remaining in place, the propeller can be placed in a rotating chuck and turned and shifted until the spindle 73 is running true. The base 7 can then be removed and the hole bored in the propeller, it being made certain in this manner that the hole will be bored at exactly the proper place and at the proper inclination to agree with the blades of the propeller.

What I claim as my invention is:

1. A tool for use in determining the pitch of propellers comprising a base having means for fixing it upon and in definite relation to the axis of the propeller to be measured, an arm projecting from said base in a plane substantially radial of the propeller axis, a slide movable along said arm and cooperating therewith to determine radial distances, and a second arm receivable in said slide and held thereby always parallel to the propeller axis, and having means at its end for contacting with the propeller blades along circles struck from its axis.

2. A tool for use in determining the pitch of propellers comprising a base having means for fixing it upon and in definite relation to the axis of the propeller to be measured, an arm projecting from said base in a plane substantially radial of the propeller axis, a slide movable along said arm and cooperating therewith to determine radial distances, and a second arm receivable in said slide and held thereby always parallel to the propeller axis, and a protractor carried by the lower end of said parallel arm and having a pair of trammel points adapted to contact with the blades of the propeller, said protractor and said parallel arm cooperating to determine the angularity of the blade relative to a plane normal to the propeller axis.

3. A tool for use in determining the pitch of propellers comprising a base having means for fixing it upon and in definite relation to the axis of the propeller to be measured, an arm projecting from said base in a plane substantially radial of the propeller axis, a slide movable along said arm and cooperating therewith to determine radial distances, and a second arm receivable in said slide and held thereby always parallel to the propeller axis, and a protractor carried by the lower end of said parallel arm and having a pair of spaced trammel points adapted to contact with the blades of the propeller, said protractor and its supporting arms being disposed and arranged, relative to the propeller axis so that the center of the protractor lies always in a radius through the propeller axis, and the trammel points always engage the blades at the ends of a chord through such radius.

4. A propeller pitchometer comprising a protractor adapted to engage the blades of a propeller to be measured at spaced points located in its base line, and means for supporting said protractor for movement towards or from the axis of the propeller and in a direction lengthwise of such axis, means for fixing said supporting means in a predetermined position relative to the propeller axis, said supporting means being disposed and arranged thereby to maintain said protractor always in a plane parallel to the propeller axis.

5. A propeller pitchometer comprising a protractor adapted to contact with the blades of a propeller at two spaced points located in its base line, and means for supporting said protractor for movement towards or from the axis of the propeller and in a direction lengthwise of such axis, means for fixing said supporting means in a predetermined position relative to the propeller axis, said supporting means being disposed and arranged thereby to maintain said protractor always in a plane parallel to the propeller axis, with its center always in a radius through the propeller axis, and with said two contact points always at the ends of a chord through such radius.

6. A propeller pitchometer comprising a protractor, an arm extending parallel to the axis of a propeller to be measured, said protractor being supported on said arm for movement about its center relative thereto, and a support for said arm adapted to be fixed relative to the propeller axis and permitting movement of the arm lengthwise in directions parallel to the propeller axis, and bodily towards and from such axis.

7. A propeller pitchometer comprising a protractor, an arm extending parallel to the axis of a propeller to be measured, said protractor being supported on said arm for movement about its center relative thereto, a support for said arm permitting its lengthwise movement in directions parallel to the propeller axis, a radial arm, said support being movable thereon to move said first arm and protractor bodily towards and from the propeller axis, maintaining the first arm always parallel to this axis, and means for supporting said radial arm from the propeller in definite relation to its axis.

8. A propeller pitchometer comprising a protractor having a pair of spaced points in its base line adapted to contact with the blades of a propeller to be measured, an arm extending parallel to the propeller's axis, said protractor being supported on said arm for movement about its center relative thereto, and in a plane parallel to the propeller's axis and tangent to a radius through the center of the protractor, a support for said arm permitting its lengthwise movement only, in directions parallel to the propeller's axis, a second arm extending substantially radially of the propeller's axis and in a plane normal thereto, said support being movable lengthwise of said radial arm, whereby said first arm and protractor are moved bodily towards and from the propeller axis, maintaining the protractor always in its proper plane and with its center always in a radius of the propeller, and means for supporting said second arm from the propeller in definite relation to its axis, and for movement thereabout.

9. In a propeller pitchometer, a protractor adapted to contact with the blades of a propeller to be measured at two spaced points located in its base line, a depending arm, and means supporting said protractor from said arm and permitting angular movement of the protractor about its center without movement of the center itself.

10. In a propeller pitchometer, a protractor having a pair of spaced points located in its base line and at opposite sides of its center, and adapted to contact with the blades of a propeller to be measured, the base of said protractor, between said two points, being relieved, a supporting arm, and means supporting said protractor from said arm and permitting angular movement of the protractor about its center without movement of the center itself.

11. In a propeller pitchometer, a protractor having a pair of spaced points located in its base line and at opposite sides of its center, and adapted to contact with the blades of a propeller to be measured, the base of said protractor, between said two points, being relieved, a supporting arm, and one of said members having a part-circular slot centered at the center of the protractor and the other having a key received and slidable within said slot, whereby said protractor may move angularly relative to said arm and about its center, without movement of the center itself.

Signed at Seattle, Washington, this 19th day of October 1925.

BERT O. GODFREY.